United States Patent
Sugawara

(10) Patent No.: US 9,703,571 B2
(45) Date of Patent: Jul. 11, 2017

(54) SERVER FUNCTION SWITCHING DEVICE, METHOD AND PROGRAM, AND THIN CLIENT SYSTEM AND SERVER DEVICE

(75) Inventor: Tomoyoshi Sugawara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1082 days.

(21) Appl. No.: 12/530,590

(22) PCT Filed: Mar. 5, 2008

(86) PCT No.: PCT/JP2008/053925
§ 371 (c)(1),
(2), (4) Date: Sep. 9, 2009

(87) PCT Pub. No.: WO2008/111448
PCT Pub. Date: Sep. 18, 2008

(65) Prior Publication Data
US 2010/0106826 A1    Apr. 29, 2010

(30) Foreign Application Priority Data

Mar. 9, 2007    (JP) ................................. 2007-060165

(51) Int. Cl.
*G06F 15/173* (2006.01)
*G06F 9/44* (2006.01)

(52) U.S. Cl.
CPC .................... *G06F 9/4416* (2013.01)

(58) Field of Classification Search
CPC .................................................... G06F 9/4416
(Continued)

(56) References Cited

U.S. PATENT DOCUMENTS

2007/0008973 A1* 1/2007 Galea ............................ 370/392
2009/0172136 A1* 7/2009 Schulz et al. ................. 709/222

FOREIGN PATENT DOCUMENTS

JP    05-128031    5/1993
JP    10-326244    12/1998
(Continued)

OTHER PUBLICATIONS

Nikkei Communications. "Action against information leakage new types overcoming conventional weak points come on". Nov. 25, 2005. pp. 50-53.*
(Continued)

*Primary Examiner* — Kevin Mai

(57) ABSTRACT

Provided is a thin client system that automatically allows two types of user terminals, a network-boot-type user terminal and a screen-transfer-type user terminal, to share the same execution environment. A screen-transfer/network-boot switching system serves as a server function switching device used in the thin client system, including a server function switching section and a terminal process proxy execution section. The server function switching section accepts a connection request from the user terminal, and determines attribute of the user terminal. If the user terminal is the network-boot-type user terminal, the boot image transfer section transfers a boot image to the user terminal. If the user terminal is the screen-transfer-type user terminal, the boot image transfer section transmits a boot image to the terminal process proxy execution section. Moreover, the terminal process proxy execution section transmits screen information to the user terminal.

6 Claims, 12 Drawing Sheets

(58) Field of Classification Search
USPC .......................................................... 709/224
See application file for complete search history.

(56) References Cited

FOREIGN PATENT DOCUMENTS

| JP | 2000-339170   | 12/2000 |
|----|---------------|---------|
| JP | 2000-339245 A | 12/2000 |
| JP | 2005-327233 A | 11/2005 |
| JP | 2006-228093 A | 8/2006  |

OTHER PUBLICATIONS

International Search Report for PCT/JP2008/053925 mailed Jun. 3, 2008.
NEC Corporation, "Thin Client System", NEC Internet Web Page, www.express.nec.co.jp/products/thinclient, searched Feb. 16, 2007.
M. Sugai, "Product Shiru—Erabu—Taukadu Thin Client Jitsugen Hoshiki wa Tayoka surumo Itchoittan Genba wa Sheihin no Jakuten O Un'yo de Oginau", Nikkei Systems, No. 156, Mar. 26, 2006, pp. 174-181.

* cited by examiner

SERVER FUNCTION SWITCHING DEVICE, METHOD AND PROGRAM, AND THIN CLIENT SYSTEM AND SERVER DEVICE

The present application is the National Phase of PCT/JP2008/053925 filed on Mar. 5, 2008, which claims priority from Japanese Patent Application No. 2007-060165 filed on Mar. 9, 2007, the content of which being incorporated herein by reference.

TECHNICAL FIELD

The present invention relates to a server function switching device, method and program, and a thin client system and a server device, and particularly relates to a server function switching device, method and program which are used in a thin client system.

BACKGROUND ART

A thin client system is a system in which a client terminal that a user uses (referred to as a user terminal, hereinafter) performs the minimum necessary processes while most processes are carried out by a server. In recent years, in order to reduce the risk that information would be leaked from stolen PCs (Personal Computers), or in order to reduce costs in managing the user terminals, the thin client system is focused on. In the thin client system, the user terminals do not hold data. Therefore, if the user terminal is stolen, the likelihood that important data such as personal information would leak is low. Moreover, in the thin client system, OS (operating system) and applications are centrally controlled by the server. Therefore, the total management cost is lower than when the individual user terminals are managed. One example of such a thin client system is described in Non-Patent Document 1.

Non-Patent Document 1 describes three types of thin client system: a network boot type (a network-boot-type), a screen transfer type, and a virtual PC type.

The network boot type is a system in which OS files, application files, and data files that the user terminals use are put together in the server. According to the system, OS and applications are loaded from a hard disk of the server onto the user terminal which then executes OS and the applications. Data are loaded from the hard disk of the server onto a memory of the user terminal by the applications performed on the user terminal. The system can endure even when a network connection is cut off because the user terminal does not use the network after OS, applications, and data are loaded onto the user terminal.

The screen transfer type is a system in which the server executes applications and then transfers screen information to the user terminal. According to the system, at least a program for displaying screens runs on the user terminal; a special-purpose processor for displaying screens may be used. Data are read by applications running on the server. According to the system, information leaks rarely occur because data are not loaded onto the user terminal.

The virtual PC type is a system in which a virtual machine for client runs on the server, with applications performed on the virtual machine to transfer image information to the terminal. The virtual PC type is substantially the same as the screen transfer type except that the virtual machine is used instead of the server. That is, OS and a program for displaying screens run on the user terminal. Data are read by applications running on the virtual machine. According to the system, like that of the screen transfer type, information leaks rarely occur. Accordingly, the virtual PC type can be considered to be one form of the screen transfer type.

The network-boot-type is available on PC equipped with a network boot function called PXE (Preboot eXecution Environment) even if PC does not have OS and applications installed. Meanwhile, what the screen transfer type needs to do is just to display screens. Therefore, high-speed CPU and large-capacity memories are unnecessary, making it possible for cellular phones to be screen-transfer-type user terminals for example.

Patent Document 1 describes other example of the thin client system. According to the thin client system disclosed in Patent Document 1, a plurality of thin client programs can be stored in the user terminal. The programs can be selected at the time of startup. Therefore, one user terminal (a network terminal device) can serve as a thin client for a plurality of servers.

FIG. 12 is a block diagram illustrating the configuration of a thin client system disclosed in Patent Document 1. With reference to FIG. 12, basic software is stored in user terminals 905a to 905n to use Windows NT (Registered Trademark) server 902 and UNIX (Registered Trademark) server 903, and Terminal server 904. The basic software is software that is stored in the user terminals and is used by the user terminals. The basic software is the minimum necessary software, such as one type of OS or software for displaying, to remotely control various kinds of application software stored in the server via a network 901. Each of the user terminals 905a to 905n is configured so that a plurality of different basic software programs can be stored.

When a user selects a server that the user wants to use during the startup process of the user terminal, a basic software corresponding to the server is selected and starts running. Then, the user terminal is connected to the server via the network 901. Once the server is selected, the previously-used server will be selected as default. The basic software stored in the user terminal can be changed by downloading. When the basic software is changed, the user selects a storage device where the program will be saved on the user terminal side. Then, the server is operated to transmit the basic software. Moreover, a plurality of the servers may be put together into physically one server. According to such a configuration, the user can switch the basic thin-client software to use a plurality of thin-client servers. Furthermore, a relatively small OS that does not use the thin-client servers may be used.

Patent Document 1: JP-A-2000-339245 (Pages 3 to 8, FIG. 1)

Non-Patent Document 1: NEC Web page, "Thin Client System," [online], [Searched on Feb. 16, 2007] Internet <URL: http://www.express.nec.co.jp/products/thinclient.html>

SUMMARY OF INVENTION

Technical Problem

However, the above-mentioned related technologies have the following problems.

The first problem is that if a user has two types of user terminals, the network boot type and the screen transfer type, the two user terminals cannot automatically share the same execution environment. The reason is that, as described in Non-Patent Document 1, the network-boot-type thin client system provides a different usage environment from that of the screen-transfer-type thin client system. Therefore, the network-boot-type and screen-transfer-type thin client systems cannot take over applications or the setting of OS from each other.

The second problem is that it is only the user terminals that can select the server or the function offered by the server. The reason is that, in the thin client system disclosed in Patent Document 1, it is the user terminal that selects the server to which the user terminal will be connected. Actually, depending on type of the terminal, whether the network boot type or the screen transfer type can be used can be determined. For example, in many cases, cellular phones only serve as screen-transfer-type user terminals. Moreover, given the fact that the screen transfer type can better deal with information leaks, it is desirable that a device should be used only as a screen-transfer-type user terminal if the device is connected via an unreliable network.

An exemplary object of the present invention is to provide a thin client system where the network-boot-type and screen-transfer-type user terminals can automatically share the same execution environment.

Another exemplary object of the present invention is to provide a thin client system where the servers can select a server that provides services to the user terminal, or a function that the server provides.

Solution to Problem

To achieve the above exemplary objects, according to the present invention, there is provided a server function switching device that is connected to user terminals including a network-boot-type user terminal and a screen-transfer-type user terminal via a network and that is used in a thin client system, including: a boot image transfer section that provides the network-boot-type terminal with a boot image containing a collection of files necessary for a boot process; a terminal process proxy execution section that provides an execution environment of the screen-transfer-type user terminal, and screen information; and a server function switching section.

The server function switching section receives from the user terminal a connection request containing attribute information of the user terminal; determines the attribute of the user terminal based on the attribute information; lets the boot image transfer section transfer the boot image to the user terminal, if the user terminal is the network-boot-type user terminal; and lets the boot image transfer section transmit the boot image to the terminal process proxy execution section, while letting the terminal process proxy execution section transmit the screen information to the user terminal, if the user terminal is the screen-transfer-type user terminal.

Advantageous Effects of Invention

The first effect is that two types of user terminals, the network-boot-type and screen-transfer-type user terminals, can automatically share the same execution environment. The reason is that if the server function switching device of the present invention determines that the user terminal is the network-boot-type user terminal, the server function switching device lets a server provide the function of transferring the boot image. On the other hand, if the server function switching device of the present invention determines that the user terminal is the screen-transfer-type user terminal, the server function switching device lets a server prepare a machine for thin clients on the server, boot the machine via the network, and provide the execution environment for thin clients and a screen transfer function.

The second effect is that the servers can select a server that provides services to the user terminal, or a function that the server provides. The reason is that, even for the same user, the server function switching device of the present invention automatically switches the thin client functions that the server provides between the screen-transfer type and the network-boot-type depending on attribute information of the user terminal.

Figure 1:
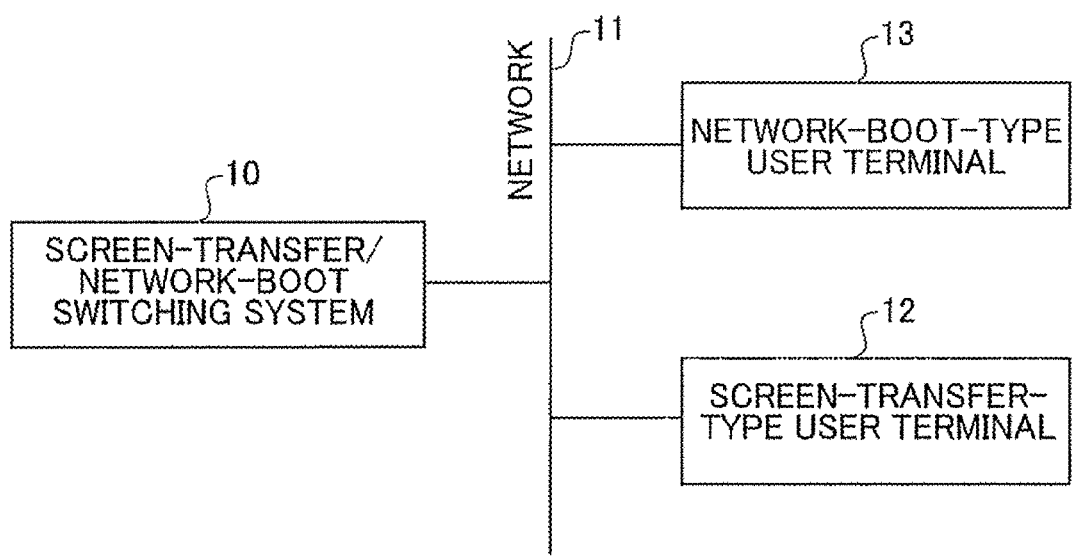
FIG. 1 is a block diagram illustrating the configuration of a thin client system according to a first exemplary embodiment of the present invention.

EXPLANATION OF REFERENCE 10, 20: Screen-transfer/network-boot switching system
11: Network
12: Screen-transfer-type user terminal
13: Network-boot-type user terminal
90: Computer
91: CPU
92: Memory
93: Hard disk
93a: Boot server program file
93b: Remote connection acceptance server program file
93c: Boot image file
94: NIC
96: LAN
97: PDA
98: PC
101: Boot image transfer section
102: Terminal process proxy execution section
103, 203: Server function switching section 111: Boot server
112: Remote connection acceptance server
113: Virtual machine
114: OS
115: VNC server
116: VNC client
204: Second boot image transfer section
1000: Cluster
1001: Boot server device
1002: Screen transfer server device
1003, 2003: Remote connection acceptance server device
1004: Network switch
2001: OS provision data center
2002: Machine provision data center

DESCRIPTION OF EMBODIMENTS

Referring to the accompanying diagrams, the following describes, in detail, the best mode for realizing a server function switching device, a method, and a program, and a thin client system and a server device according to the present invention.
(First Exemplary Embodiment)
First, with reference to FIGS. 1 to 5, a first exemplary embodiment of the present invention will be described.

FIG. 1 is a block diagram illustrating the configuration of a thin client system according to the present exemplary embodiment. With reference to FIG. 1, according to the present exemplary embodiment, a thin client system includes a screen transfer/network boot switching system 10, which serves as a server function switching device; a network 11; a screen-transfer-type user terminal 12; and a network-boot-type user terminal 13.

The screen transfer/network boot switching system 10 is connected via the network 11 to the screen-transfer-type user terminal 12 and network-boot-type user terminal 13, and communicates with the screen-transfer-type user terminal 12 and the network-boot-type user terminal 13. For ease of explanation, described here are one screen-transfer-type user terminal 12 and one network-boot-type user terminal 13. However, there may be a plurality of screen-transfer-type user terminals 12 and network-boot-type user terminals 13 connected to the screen transfer/network boot switching system 10.

The screen-transfer-type user terminal 12 is a user terminal that is used in a screen-transfer-type thin client system and has a function to display screen information that the server transmits. On the screen-transfer-type user terminal, a software program for displaying the screen information runs. Such a software program includes, for example, ICA Client of Citrix (Registered Trademark), and Remote Desktop Client of Microsoft (Registered Trademark).

The screen-transfer-type user terminal 12 transmits a screen-transfer-type connection request to the screen transfer/network boot switching system 10 to establish a network connection with the screen transfer/network boot switching system 10, and then receives the screen information. The screen-transfer-type connection request includes at least position information of the user terminal. The position information of the user terminal is an address that represents where the user terminal is. As the position information, for example, an IP address can be used.

Meanwhile, the network-boot-type user terminal 13 is a user terminal used in the network-boot-type thin client system. The network-boot-type user terminal 13 receives a boot image transmitted from the server, and boots. After the network-boot-type user terminal 13 is booted, OS and applications run on the network-boot-type user terminal 13. As the type of network boot, for example, there is PXE boot.

The network-boot-type user terminal 13 transmits a boot-type connection request to the screen transfer/network boot switching system 10 to establish a network connection with the screen transfer/network boot switching system 10, and receives the boot image. The boot-type connection request includes at least the position information of the user terminal. The position information of the user terminal is the same as that of the screen-transfer-type user terminal 12. That is, the position information of the user terminal is an address that represents where the user terminal is.

Here, the boot image is a collection of files necessary to boot, and includes at least the core of OS. For example, in the case of Linux, the core of OS is a kernel. Moreover, the boot image may include commands, setting files, files that users use, and the like. For example, in the case of Linux, commands are a collection of execution files stored under such directories as /bin or /sbin, while the setting files are a group of files stored under a directory of /etc. For example, in the case of Linux, the files that users use are often stored under a directory of /home. If the boot image includes a plurality of files, the files may be put together into one file. In order to put together the files into one file, for example, compression formats such as ZIP can be used.

Figure 2:
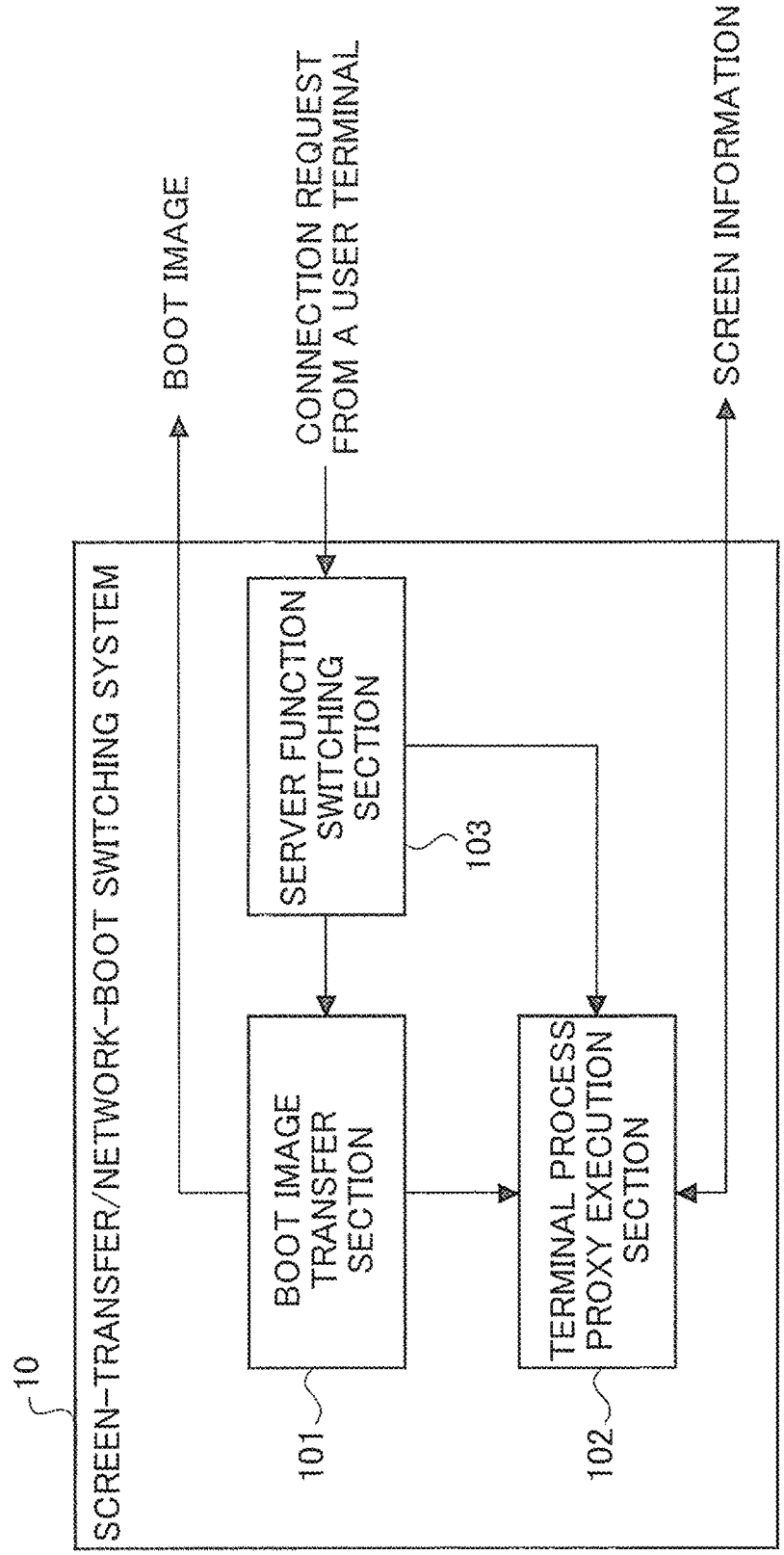
FIG. 2 is a block diagram illustrating the configuration of the screen transfer/network boot switching system which serves as a server function switching device used in a thin client system, according to the first exemplary embodiment of the present invention.

FIG. 2 is a block diagram illustrating the configuration of the screen transfer/network boot switching system 10. With reference to FIG. 2, the screen transfer/network boot switching system 10 includes a boot image transfer section 101, a terminal process proxy execution section 102, and a server function switching section 103.

In the boot image transfer section 101, one boot image for network boot is stored. Moreover, when the boot image transfer section 101 receives a request from the server function switching section 103, the boot image transfer section 101 performs a boot image transfer process to transfer the boot image to the specified destination. The request for the boot image transfer process includes at least the position information of a device to which the boot image is transferred. The position information of a device to which the boot image is transferred is, for example, an IP address. If a device to which the boot image is transferred is the network-boot-type user terminal 13, the boot image transfer section 101 serves as a server of the network-boot-type thin client system.

The terminal process proxy execution section 102 serves as a server of the screen-transfer-type thin client system. That is, the terminal process proxy execution section 102 transmits image data of a screen to the screen-transfer-type user terminal 12. However, the terminal process proxy execution section 102 does not start OS of the screen-transfer-type user terminal 12 from the beginning. When the terminal process proxy execution section 102 receives a request from the server function switching section 103, the terminal process proxy execution section 102 performs a boot start process to acquire the boot image from the boot image transfer section 101 and start OS and applications.

The server function switching section 103 accepts a connection request from the screen-transfer-type user terminal 12 and the network-boot-type user terminal 13 via the network 11. As described above, there are two types of connection request from the user terminal: the screen-transfer-type connection request, which is transmitted by the screen-transfer-type user terminal 12, and the boot-type connection request, which is transmitted by the network-boot-type user terminal 13.

Moreover, if the connection request that the server function switching section 103 has received from the user terminal is the screen-transfer-type connection request, the server function switching section 103 determines that the user terminal requesting a connection is the screen-transfer-type user terminal 12, and requests the terminal process proxy execution section 102 to perform the boot start process. The request for the boot start process includes at least the position information of the user terminal. For the position information, the position information of the user terminal included in the screen-transfer-type connection request is specified. Meanwhile, if the connection request that the server function switching section 103 has received from the user terminal is the boot-type connection request, the server function switching section 103 determines that the user terminal requesting a connection is the network-boot-type user terminal 13, and requests the boot image transfer section 101 to perform the boot image transfer process. The request for the boot image transfer process includes at least the position information of the user terminal. For the position information, the position information of the user terminal included in the boot-type connection request is specified.

For example, one of the methods to distinguish the connection requests transmitted from the user terminals is to have the connection request include the type of the user terminal. In this case, for example, the following character strings can be used as identifiers representing type of the user terminal: "RDT" for the screen-transfer-type, and "NBT" for the network boot type. Moreover, other example of the method to distinguish the connection requests transmitted from the user terminals is to use the port numbers of TCP/IP communication. In this case, for example, if the port number is 100, it is determined that the user terminal is the screen-transfer-type user terminal; if the port number is 200, it is determined that the user terminal is the network-boot-type user terminal.

Figure 3:
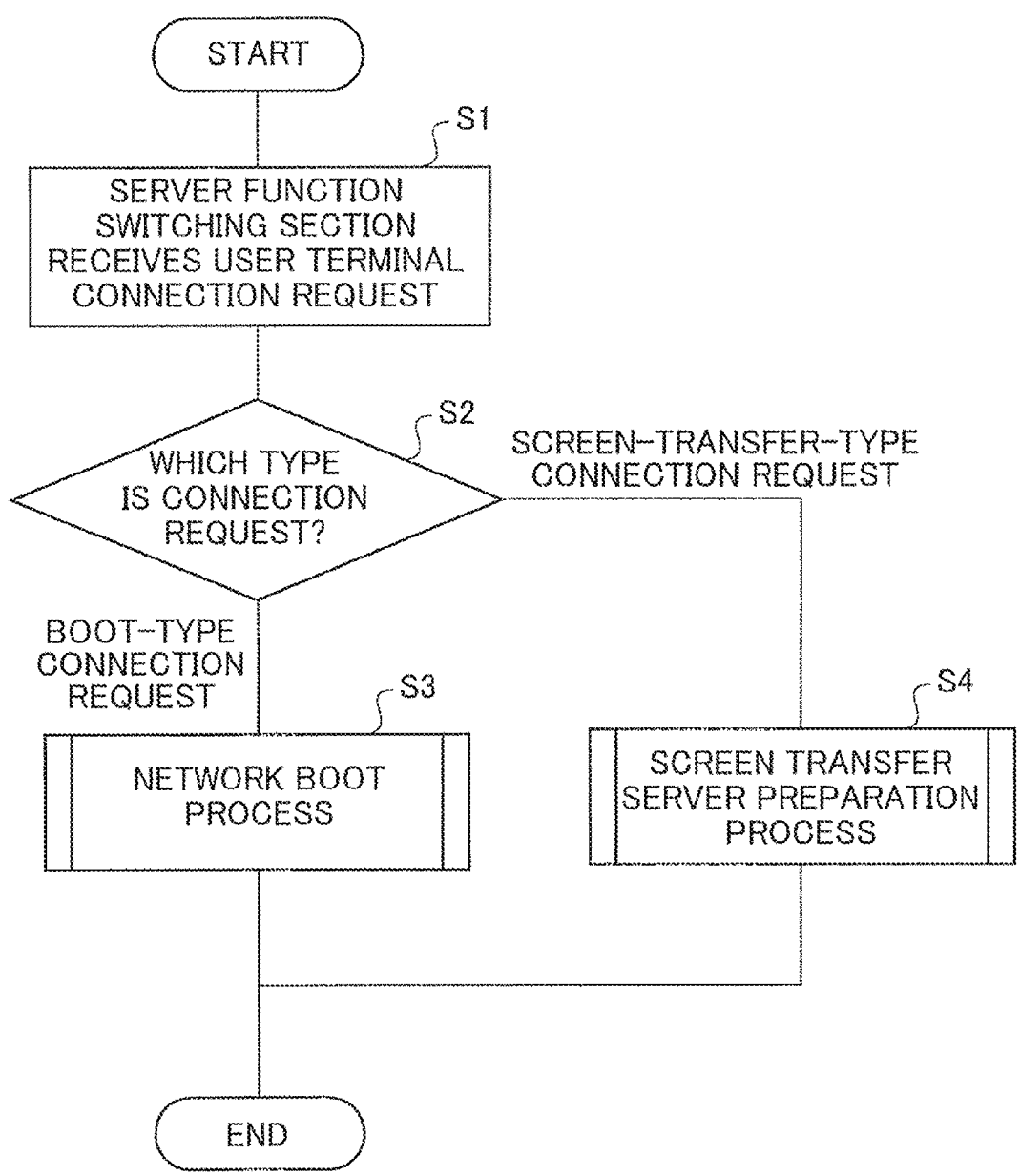
FIG. 3 is a flowchart illustrating the operation of the first exemplary embodiment of the present invention.

The following describes, in detail, the overall operation of the present exemplary embodiment with reference to FIGS. 1, 2, and 3.

FIG. 3 is a flowchart illustrating the operation of the present exemplary embodiment. First, the server function switching section 103 receives a user terminal connection request (step S1). Then, the server function switching section 103 takes out the identifier representing the type of the terminal from the user terminal connection request, and determines the type of the user terminal (step S2). If the result shows that the type of the user terminal is the network-boot-type user terminal 13, a network boot process, described below, is carried out (step S3). Whereas, if the type of the user terminal is the screen-transfer-type user terminal, a screen transfer server preparation process, described below, is carried out (step S4).

Figure 4:
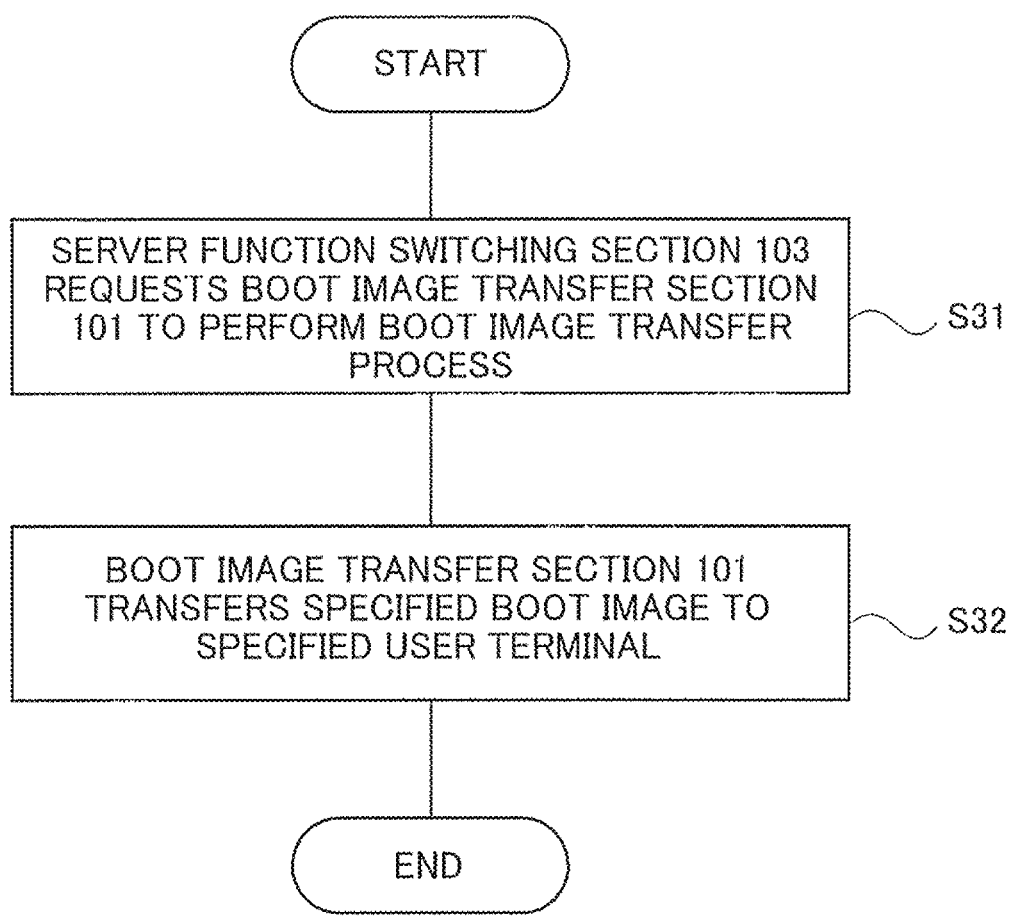
FIG. 4 is a flowchart illustrating the operation of a network boot process shown in FIG. 3.

The following describes the network boot process (FIG. 3: step S3) with reference to FIG. 4. First, the server function switching section 103 requests the boot image transfer section 101 to perform the boot image transfer process (step S31). Then, the boot image transfer section 101 transfers the specified boot image to the specified user terminal (step S32).

Figure 5:
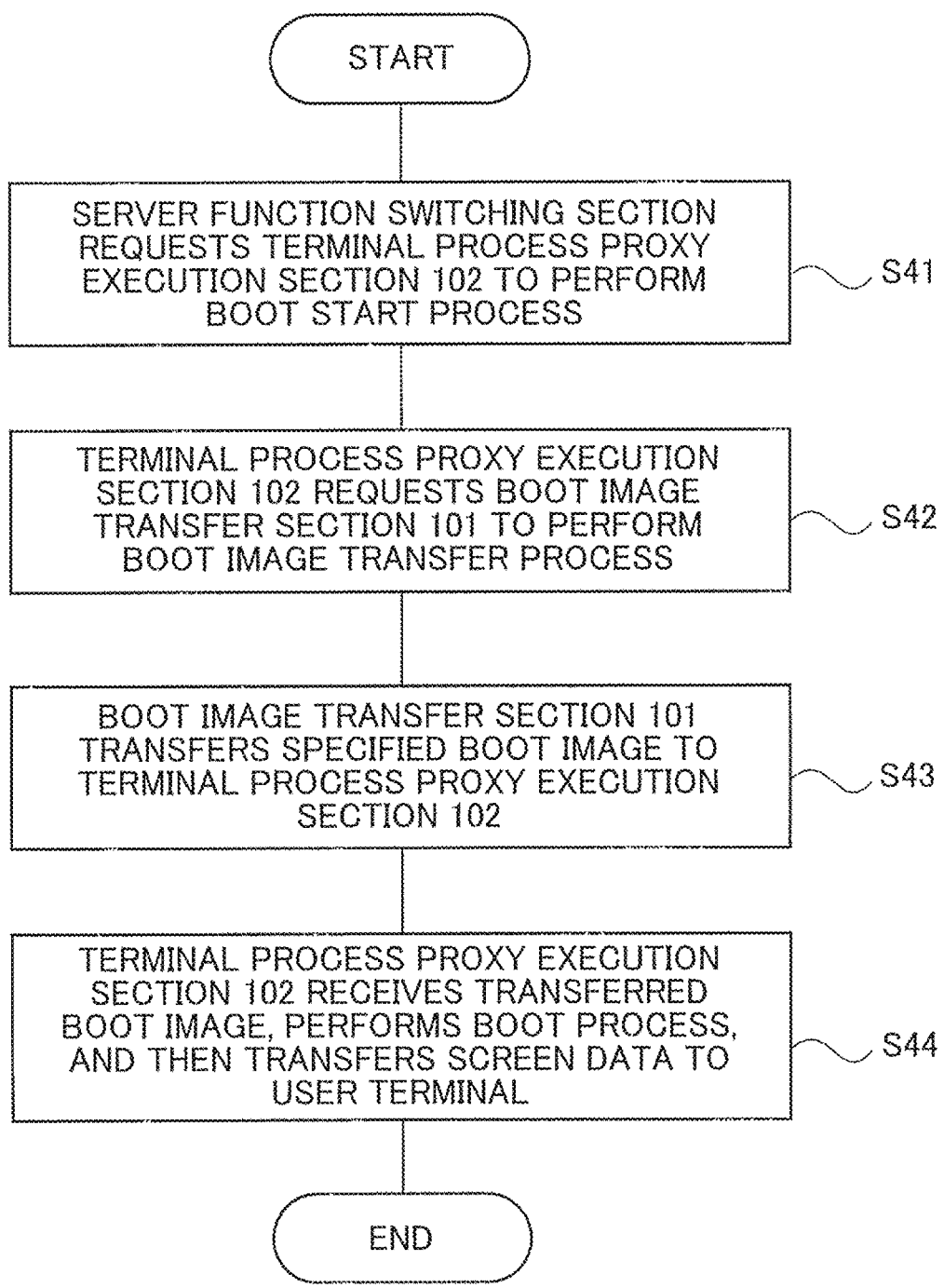
FIG. 5 is a flowchart illustrating the operation of a screen transfer server preparation process shown in FIG. 3.

The following describes the screen transfer server preparation process (FIG. 3: step S4) with reference to FIG. 5. First, the server function switching section 103 requests the terminal process proxy execution section 102 to perform the boot start process (step S41). Then, the terminal process proxy execution section 102 requests the boot image transfer section 101 to perform the boot image transfer process (step S42). Subsequently, the boot image transfer section 101 transfers the specified boot image to the terminal process proxy execution section 102 (step S43). Then, the terminal process proxy execution section 102 receives the transferred boot image. After being booted, the terminal process proxy execution section 102 establishes a connection with the user terminal, and transmits the image data of screens to the user terminal (step S44).

The following describes the effects of the present exemplary embodiment.

The configuration of the present exemplary embodiment is a combination of a server for the network-boot-type thin client system, a server for the screen-transfer-type thin client system, and the server function switching section 103. Therefore, the user terminal of the network-boot-type thin client system and the server of the screen-transfer-type thin client system can use the same boot image. That is, the user can use the same execution environment on the screen-transfer-type user terminal 12 and the network-boot-type user terminal 13.

That is, according to the present exemplary embodiment, for the same user, the thin client function that the server provides is automatically switched between the screen transfer type and the network boot type in accordance with attribute information such as ID (identifier) representing type of the user terminal, and, in either case, the thin client system provided can provide the same usage environment.

(Second Exemplary Embodiment)

Figure 6:
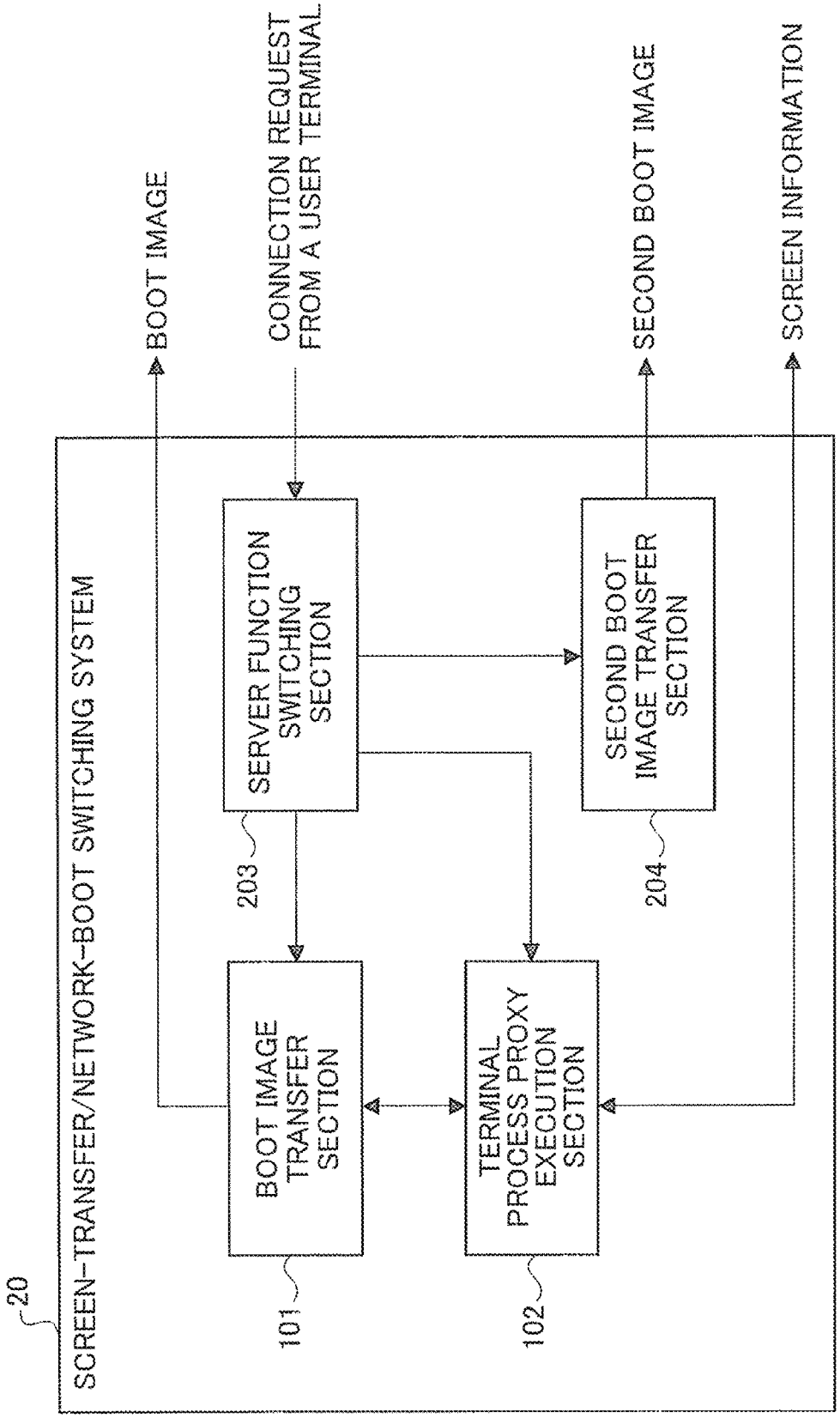
FIG. 6 is a block diagram illustrating the configuration of the screen transfer/network boot switching system which serves as a server function switching device used in a thin client system, according to a second exemplary embodiment of the present invention.
Figure 7:
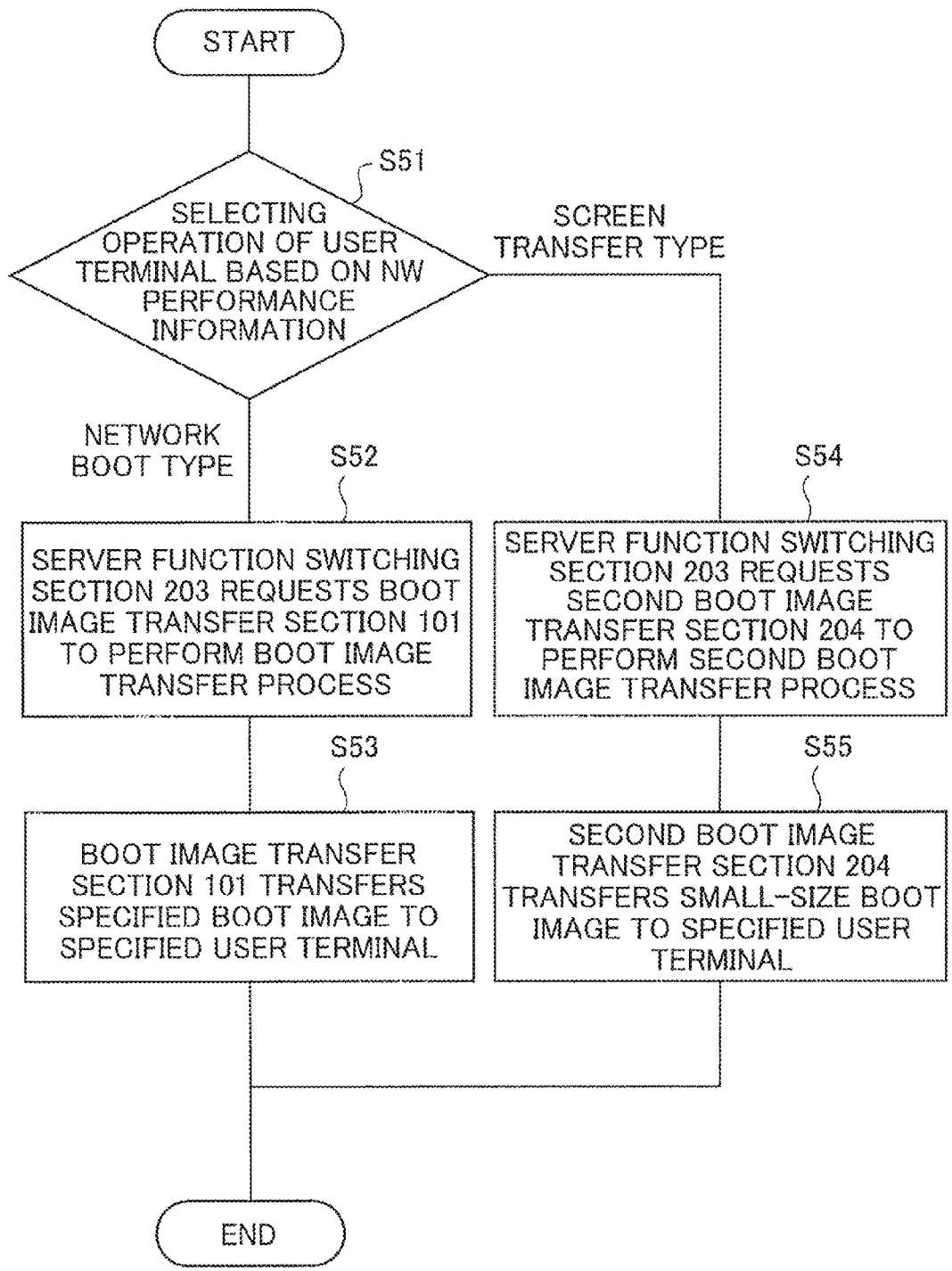
FIG. 7 is a flowchart illustrating other operation of the network boot process shown in FIG. 3.

The following describes a second exemplary embodiment of the present invention with reference to FIGS. 6 and 7.

According to the first exemplary embodiment, the network-boot-type user terminal is previously separated from the screen-transfer-type user terminal. The screen transfer/network boot switching system 10 switches the thin client services to be provided in accordance with type of the user terminal. On the other hand, the thin client system of the present exemplary embodiment switches the thin client services to be provided in accordance with not only type of the user terminal but performance of a network connection that connects the user terminal to the server.

The following describes the present exemplary embodiment in detail. In comparison with the first exemplary embodiment, the present exemplary embodiment is a thin client system where the screen transfer/network boot switching system 10 is replaced by a screen transfer/network boot switching system 20. Therefore, the difference between the first and second exemplary embodiments, or the screen transfer/network boot switching system 20, will be described.

FIG. 6 is a block diagram illustrating the configuration of the screen transfer/network boot switching system 20. With reference to FIG. 6, the screen transfer/network boot switching system 20 includes a boot image transfer section 101, a terminal process proxy execution section 102, a server function switching section 203, and a second boot image transfer section 204.

The boot image transfer section 101 and the terminal process proxy execution section 102 are the same as those of the first exemplary embodiment. That is, one boot image for network boot is stored in the boot image transfer section 101. Moreover, when the boot image transfer section 102 receives a request from the server function switching section 103, the boot image transfer section 102 performs a boot image transfer process to transfer the boot image to the specified destination. The request for the boot image transfer process includes at least the position information of a device to which the boot image is transferred. The terminal process proxy execution section 102 transmits image data of screens to the screen-transfer-type user terminal. However, the terminal process proxy execution section 102 does not start OS of the screen-transfer-type user terminal from the beginning. When the terminal process proxy execution section 102 receives a request from the server function switching section 103, the terminal process proxy execution section 102 performs a boot start process to acquire the boot image from the boot image transfer section 101 and start OS and applications.

A network-boot-type boot image is stored in the second boot image transfer section 204. However, the stored boot image is a small-size boot image (a second boot image) to provide the screen-transfer-type thin client function, and is different from the boot image stored in the boot image transfer section 101.

Moreover, when the second boot image transfer section 204 is requested to perform a second boot image transfer process, the second boot image transfer section 204 transfers the small-size boot image to a specified destination. The request for the second boot image transfer process includes at least the position information of a device to which the boot image is transferred. For example, an IP address can be used as the position information of the destination.

Here, the small-size boot image is a collection of files necessary to provide the screen-transfer-type thin client function, and includes at least the core of OS and a program for the screen-transfer-type thin client. The small-size boot image may include other files. However it is desirable that the small-size boot image have a bare minimum of files in order to keep the size of the boot image down. If the small-size boot image contains a plurality of files, the files may be put together into one file. In order to put together the files into one file, for example, compression formats such as ZIP can be used.

The server function switching section 203 receives, via the network 11, a screen-transfer-type connection request from the screen-transfer-type user terminal 12, and a second boot-type connection request from the network-boot-type user terminal 13.

The screen-transfer-type connection request is the same as that of the first exemplary embodiment. That is, the screen-transfer-type connection request includes at least the position information of the user terminal. Meanwhile, the second boot-type connection request includes at least information (referred to as "NW performance information," hereinafter) about performance of a network connection, and the position information of the user terminal.

As the NW performance information, the transfer speed and network latency of a network connection between the user terminal and the screen transfer/network boot switching system 20 can be used, for example. Moreover, as other example, the reliability of the network can be used as the NW performance information: Specifically, the reliability of the network is determined based on whether the connection is inside a company or outside the company, the strength of encryption for data transfer, or the like. The position information of the user terminal, like the boot-type connection request, is an address representing where the user terminal is.

Moreover, like the first exemplary embodiment, based on a connection request from the user terminal, the server function switching section 203 makes a determination as to whether the user terminal requesting a connection is the screen-transfer-type user terminal 12 or the network-boot-type user terminal 13. If the user terminal's request for connection is the screen-transfer-type connection request, the same process as that of the first exemplary embodiment will be performed. That is, the server function switching section 203 requests the terminal process proxy execution section 102 to perform the boot start process.

On the other hand, if the user terminal's request for connection is the boot-type connection request, the server function switching section 203, based on the NW performance information included in the user terminal connection request, makes a determination as to whether to let the user terminal requesting the connection operate as a screen-transfer-type thin client or a network-boot-type thin client.

As the determination method of the user terminal, there is the following method: For example, in the case where the transfer speed of the network connection is used as the NW performance information, the server function switching section 203 decides to let the user terminal operate as the screen-transfer-type thin client when the transfer speed is less than a reference value, while the server function switching section 203 decides to let the user terminal operate as the network-boot-type thin client when the transfer speed is greater than or equal to the reference value. If the server function switching section 203, as a result of determination, decides to let the user terminal operate as the network-boot-type thin client, the server function switching section 203, like the first exemplary embodiment, requests the boot image transfer section 101 to perform the boot image transfer process. On the other hand, if the server function switching section 203 decides to let the user terminal operate as the screen-transfer-type thin client, the server function switching section 203 requests the second boot image transfer section 204 to perform the second boot image transfer process.

The following describes, in detail, the difference in operation between the present exemplary embodiment and the first exemplary embodiment, with reference to FIGS. 6 and 7.

FIG. 7 is a flowchart illustrating a network boot process according to the present exemplary embodiment. The overall operation of the present exemplary embodiment is the same as that of the first exemplary embodiment. Since a network boot process is different from the first exemplary embodiment's network boot process shown in FIG. 3, the network boot process will be described.

First, the server function switching section 203 takes the NW performance information out from the boot-type connection request. Based on the NW performance information, the server function switching section 203 makes a determination as to whether to let the user terminal requesting a connection operate as the screen-transfer-type thin client or the network-boot-type thin client (step S51).

If the server function switching section 203 at step S51 decides to let the user terminal operate as the network-boot-type thin client, the server function switching section 203 requests the boot image transfer section 101 to perform the boot image transfer process (step S52). Then, the boot image transfer section 101 transfers the specified boot image to the specified user terminal (step S53).

Meanwhile, if the server function switching section 203 at step S51 decides to let the user terminal operate as the screen-transfer-type thin client, the server function switching section 203 requests the second boot image transfer section 204 to perform the second boot image transfer process (step S54). Then, the second boot image transfer section 204 transfers the small-size boot image to the specified user terminal (step S55).

The above is a flowchart illustrating the network boot process according to the present exemplary embodiment.

Among the network-boot-type user terminals 13, those that have received the boot image from the second boot image transfer section 204 and carried out a boot process transmit a screen-transfer-type connection request to the screen transfer/network boot switching system 20 after being booted. Accordingly, the same processes as those performed when the screen-transfer-type user terminal 12 has transmitted the screen-transfer-type connection request are performed inside the screen transfer/network boot switching system 20, and the network-boot-type user terminal 13 operates as a screen-transfer-type thin client.

The following describes the effects of the present exemplary embodiment.

According to the configuration of the present exemplary embodiment, when the network-boot-type user terminal 13 requests a connection, a determination is made based on the NW performance information as to whether the network-boot-type user terminal 13 should operate as a screen-transfer-type thin client or a network-boot-type thin client. Accordingly, even when the same network-boot-type user terminal 13 is used, an appropriate thin client service is provided to a user in accordance with performance of a network used at that time.

That is, according to the present exemplary embodiment, the thin client function that the server provides can automatically switch between the screen transfer type and the network boot type based on the latency or throughput of the network or the degree of safety of the network. In either case, the thin client system capable of offering the same usage environment can be provided.

As described above, according to the first and second exemplary embodiments, based on the type and attribute of the user terminal and the type and attribute of the network between the user terminal and the server, what the server offers can be switched between the screen transfer function and the network boot function.

The following describes modifications to the above-described first and second exemplary embodiments.

(First Modification)

According to the first and second exemplary embodiments, a collection of files including OS and applications is used as the boot image, and a network boot for the user terminal or the terminal process proxy execution section 102 is carried out. However, a hibernation image may be used instead of the boot image. The hibernation image is a file in which the state of a memory of a running machine is saved. With the use of the hibernation image, the running programs are saved without change; the machine can take over the execution state later and restart work, or other machine can take over the execution state and restart work.

(Second Modification)

Furthermore, other modification to the present exemplary embodiment will be described.

According to the first and second embodiments, the boot image transfer section 101 holds one boot image. Alternatively, the boot image transfer section 101 may hold a plurality of boot images. As a result of this change, the screen-transfer-type connection request is also changed so as to include at least the position information of the user terminal and identifiers of the boot images.

The boot-type connection request is changed so as to include at least the position information of the user terminal and the identifiers of the boot images. The request to the boot image transfer section 101 for the boot image transfer process is changed so that the request can provide at least the identifier specifying a boot image and the position information of a device to which the boot image is transferred.

The request to the terminal process proxy execution section 102 for the boot start process is changed so that the request can provide at least the identifier of the boot image. A file name or path name can be used as the identifier of the boot image and the identifier specifying the boot image.

According to the present modification, one screen transfer/network boot switching system 20 can save a plurality of boot images on the screen transfer/network boot switching system, making it possible to efficiently manage the boot images.

(Third Modification)

Furthermore, a third modification to the present embodiment will be described.

According to the second embodiment, a connection is accepted from one network, and the thin client services to be provided are switched according to attribute of the network. According to the present modification, a connection may be accepted from a plurality of networks. If a connection is accepted from a plurality of networks, it is possible to divide networks into two groups: an exclusive group for network boot, and an exclusive group for screen transfer.

The following describes a specific embodiment of the present invention, with reference to FIGS. 8 to 11.

Example 1

Figure 8:
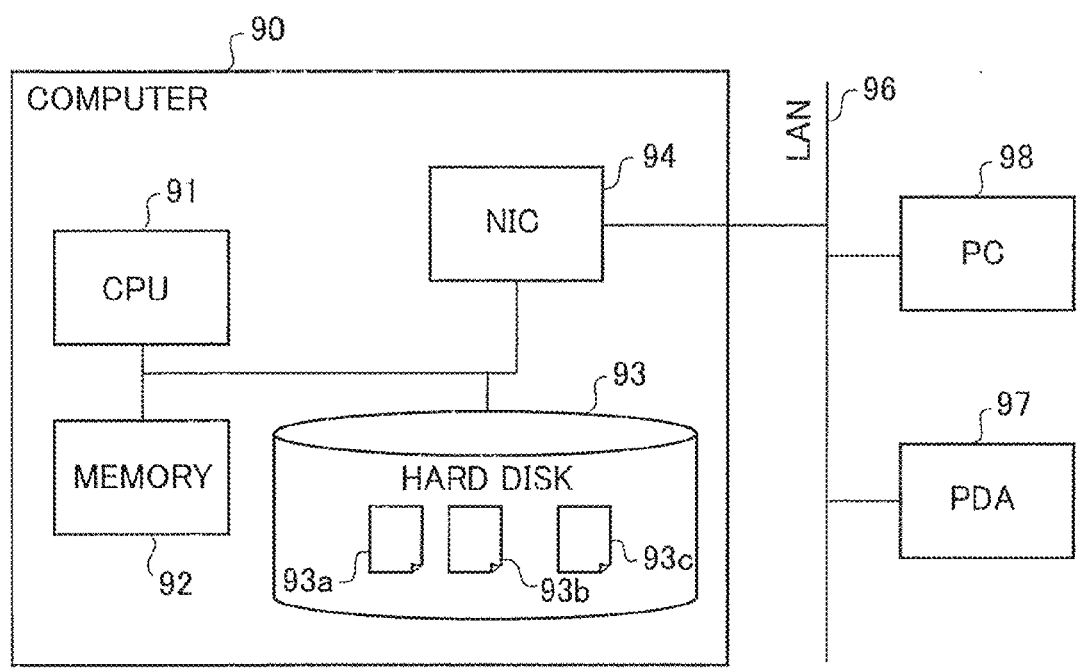
FIG. 8 is a block diagram illustrating the hardware configuration of a thin client system according to Example 1 of the present invention.
Figure 9:
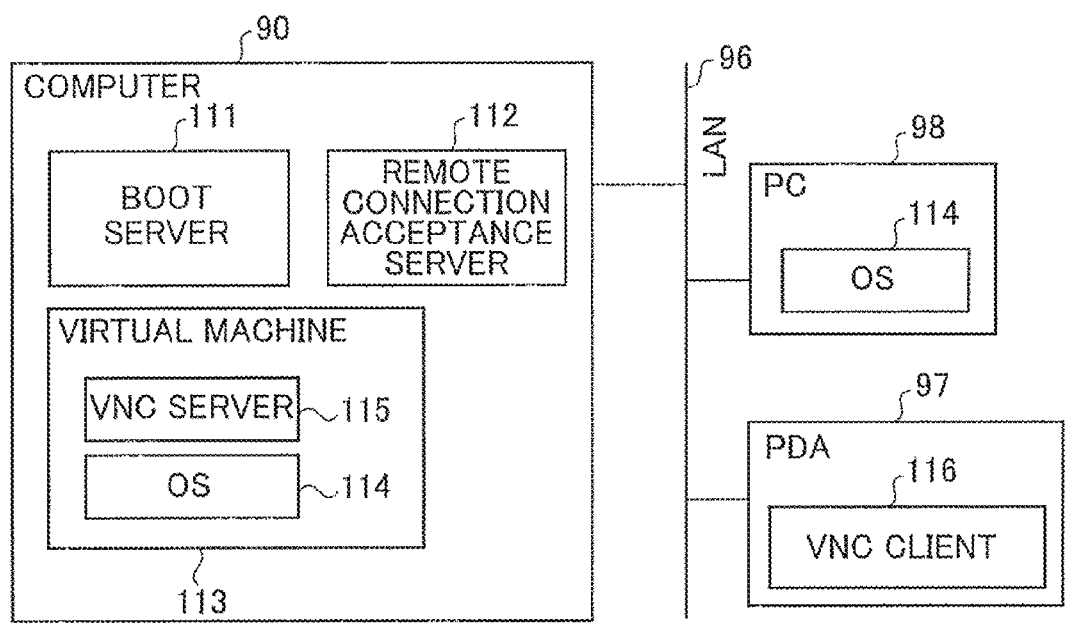
FIG. 9 is a block diagram illustrating the software configuration of a thin client system according to Example 1 of the present invention.

Example 1 is the equivalent of the first exemplary embodiment of the present invention. The screen transfer/network boot switching system 10 runs on one computer. FIG. 8 is a block diagram illustrating the hardware configuration of the present example. FIG. 9 is a block diagram illustrating the software configuration of the present example.

With reference to FIG. 8, a computer 90 for realizing the screen transfer/network boot switching system 10 is a typical computer including at least CPU (Central Processing Unit) 91, a memory 92, a hard disk 93, and NIC (Network Interface Card) 94.

With reference to FIG. 9, the boot image transfer section 101 and the server function switching section 103 are realized as a boot server 111 and a remote connection acceptance server 112, respectively. The two programs are, as shown in FIG. 8, saved in the hard disk 93 of the computer 90 as a file 93a and a file 93b. The programs are loaded onto a memory 92 and executed by CPU 91. The remote connection acceptance server 112 is connected to the user terminal via NIC 94 and LAN 96.

Moreover, the terminal process proxy execution section 102 is realized as a virtual machine 103 which is prepared on the server. The virtual machine 113 can be provided by running existing virtual machine software, such as VMware (Registered Trademark) or Xen, on the server. Moreover, as shown in FIG. 8, the boot image is saved in the hard disk 93 as a file 93c. The file 93c is accessed by the boot server 111.

Furthermore, as a user terminal to be connected to the computer 90, there are PDA (Personal Digital Assistant) 97 and PC 98. PDA 97 is the equivalent of the screen-transfer-type user terminal 12. PC 98 is the equivalent of the network-boot-type user terminal 13.

VNC (Virtual Network Computing) client 116, a screen display application, is running on PDA 97. When PDA 97 transmits a VNC's connection request to the computer 90, the remote connection acceptance server 112 receives the VNC's connection request and then issues a boot start command to the virtual machine 113.

After starting a boot process, the virtual machine 113 follows the procedure of PXE boot to access the boot server 111 via a virtual network, acquire the boot image, and then boot OS 114 in the boot image. After completing the boot process of OS 114, the virtual machine 113 starts a VNC server 115 included in the boot image, and transmits screen information to PDA 97. A VNC client 116 of PDA 97 receives the screen data and displays the screen data on a screen of PDA.

Meanwhile, PC 98 starts a boot process after being switched on. Following the procedure of PXE boot, PC 98 transmits a network boot connection request to the computer 90. The remote connection acceptance server 112 receives the network boot connection request, and executes a command to instruct the boot server 111 to transfer a boot image. Then, the boot server 111 transmits the boot image to PC 98. PC 98 acquires the boot image, and then boots OS 114 in the boot image.

The above describes the operation of Example 1. The example demonstrates the following fact: Since one computer 90 includes the function of the screen transfer/network boot switching system 10, the thin client service that the computer 90 offers can switch between the VNC's screen transfer type and the PXE boot's network boot type depending on whether the terminal the user uses is PDA or PC.

Example 2

Figure 10:
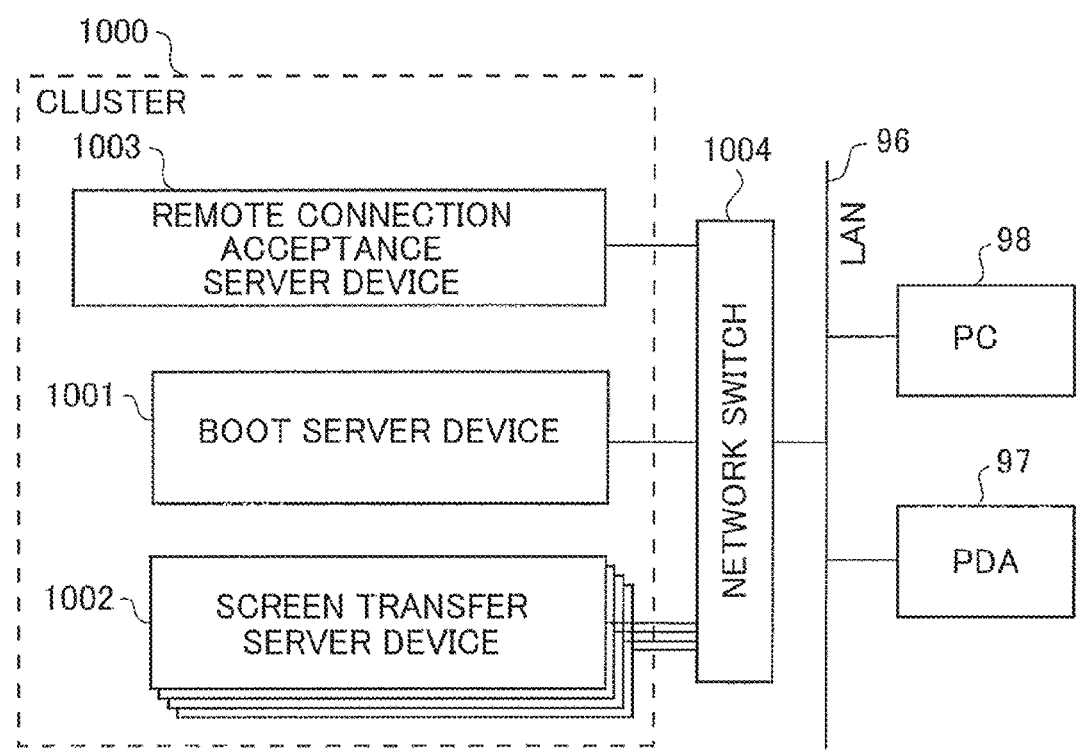
FIG. 10 is a block diagram illustrating the hardware configuration of a thin client system according to Example 2 of the present invention.

The following describes Example 2. According to the Example 2, the screen transfer/network boot switching system 10 runs on a cluster having a plurality of computers. FIG. 10 is a block diagram illustrating the hardware configuration of the Example 2.

With reference to FIG. 10, the cluster 1000 for realizing the screen transfer/network boot switching system 10 includes a boot server device 1001, a screen transfer server device 1002, a remote connection acceptance server device 1003, and a network switch 1004.

Inside the cluster 1000, the boot image transfer section 101, the terminal process proxy execution section 102, and the server function switching section 103 are realized as the boot server device 1001, the screen transfer server device 1002, the remote connection acceptance server device 1003, respectively.

The boot server device 1001, the screen transfer server device 1002, the remote connection acceptance server device 1003 are computers including CPU, memories and NIC, are connected to the network switch 1004, and can communicate with one other.

On the boot server device 1001, the same programs as those of the boot server 111 of Example 1 run. On the remote connection acceptance server device 1003, the same programs as those of the connection acceptance server 112 of Example 1 run. The screen transfer server device 1002 includes a plurality of devices. OS of the screen transfer server device 1002 has yet to be booted before the screen transfer server device 1002 is connected to the user terminal.

When PDA 97 transmits a VNC's connection request to the remote connection acceptance server device 1003, the remote connection acceptance server device 1003 receives the VNC's connection request, selects one of the screen transfer server devices 1002 (1002-1, in this case), and issues a boot start command to the screen transfer server device 1002-1.

After starting a boot process, the screen transfer server device 1002-1 follows the procedure of PXE boot to access the boot server device 1001 via the network switch 1004, acquire the same boot image as that of Example 1, and boot OS in the boot image. After completing the boot process of OS, the screen transfer server device 1002-1 starts a VNC server in the boot image, and transmits screen information to PDA 97 via LAN 96. A VNC client of PDA 97 receives the screen data, and displays the screen data on a screen of PDA.

Meanwhile, PC 98 starts a boot process after being switched on. Following the procedure of PXE boot, PC 98 transmits a network boot connection request to the remote connection acceptance server device 1003. The remote connection acceptance server device 1003 receives the network boot connection request, and executes a command to instruct the boot server device 1001 to transfer a boot image via the network switch 1004. Then, the boot server device 1001 transmits the boot image to PC 98 via LAN 96. PC 98 acquires the boot image, and then boots OS in the boot image.

The above describes the operation of Example 2. The example demonstrates the following fact: Since the cluster having a plurality of computers has the function of the screen transfer/network boot switching system 10, the thin client service that the computer 90 offers can switch between the VNC's screen transfer type and the PXE boot's network boot type depending on whether the terminal the user uses is PDA or PC.

Example 3

Figure 11:
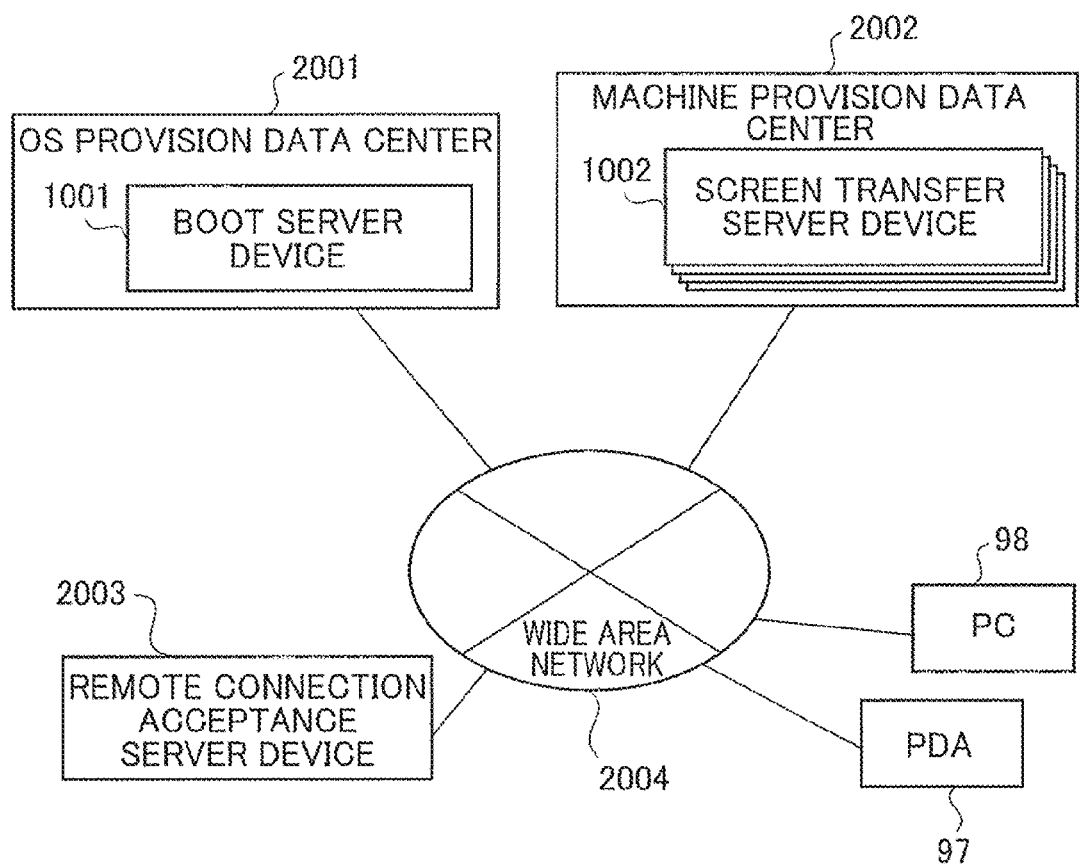
FIG. 11 is a block diagram illustrating the configuration of a thin client system according to Example 3 of the present invention.
Figure 12:
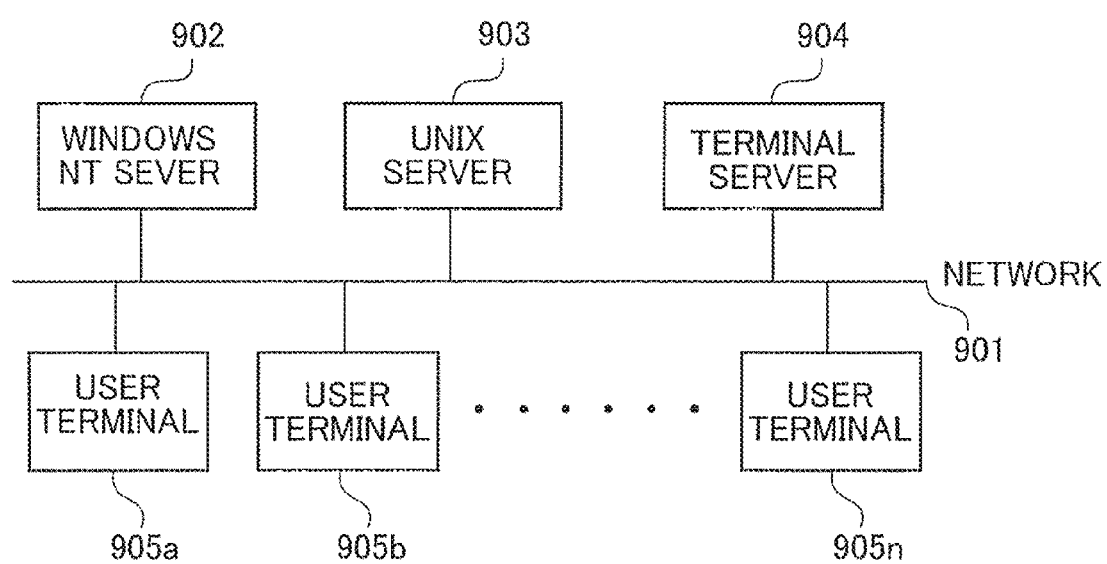
FIG. 12 is a block diagram illustrating the configuration of a thin client system disclosed of a related technology.

The following describes Example 3. According to the Example 3, each element of the screen transfer/network boot switching system 10 is disposed in a decentralized manner in a plurality of data centers on a wide area network, and is operated. FIG. 11 is a block diagram illustrating the system configuration of the Example 3.

With reference to FIG. 11, the screen transfer/network boot switching system of the present example includes an OS provision data center 2001, a machine provision data center 2002, a remote connection acceptance server device 2003, and a wide area network 2004.

According to the present example, the boot image transfer section 101 is realized as the OS provision data center 2001. The terminal process proxy execution section 102 is realized as the machine provision data center 2002. The server function switching section 103 is realized as the remote connection acceptance server device 2003. In the OS provision data center 2001, the same boot server device 1001 as that of Example 2 runs to provide the boot image. The machine provision data center 2002 includes a plurality of computers that serve as the same screen transfer server device 1002 as that of Example 2.

When PDA 97 transmits a VNC's connection request to the remote connection acceptance server device 2003 via the wide area network 2004, the remote connection acceptance server device 2003 receives the VNC's connection request, and transmits a boot start request to the machine provision data center 2002 via the wide area network 2004. The machine provision data center 2002 selects one of the screen transfer server devices 1002 (1002-1, in this case), and issues a boot start command to the screen transfer server devices 1002-1.

After starting a boot process, the screen transfer server device 1002-1 follows the procedure of PXE boot to access the OS provision data center 2001 via the wide area network 2004, acquire the same boot image as that of Example 1, and boot OS in the boot image. After completing the boot process of OS, the screen transfer server device 1002-1 starts a VNC server in the boot image, and transmits screen information to PDA 97 via the wide area network 2004. A VNC client of PDA 97 receives the screen data, and displays the screen data on a screen of PDA.

Meanwhile, PC 98 starts a boot process after being switched on. Following the procedure of PXE boot, PC 98 transmits a network boot connection request to the remote connection acceptance server device 2003. The remote connection acceptance server device 2003 receives the network boot connection request, accesses the OS provision data center 2001 via the wide area network 2004, and executes a command to instruct the OS provision data center 2001 to transfer a boot image. Then, the OS provision data center 2001 transmits the boot image to PC 98. PC 98 acquires the boot image, and then boots OS in the boot image.

The hardware and software configuration of the above thin client system is not limited to a specific example. As long as the above-described function of each section is realized, any one can be applied. For example, the system may be configured in such a way that each circuit has the function of one section, or that one circuit collectively has a plurality of functions. Alternatively, all the functions may be realized mainly by software processes.

Moreover, if program codes are used to realize at least part of the functions of the sections constituting the above thin client system, the program codes and a recording medium on which the program codes are recorded are within the scope of the present invention. In this case, if the above functions are realized in association with other software programs such as Operating System, the program codes thereof are also included. The recording medium includes a memory device or hard disk device mounted in the computer; a disc recording medium, such as CD-ROM or DVD-ROM; a tape recording medium, such as a magnetic tape; and a portable recording medium, such as a portable semiconductor memory. Moreover, for other embodiment, the program codes stored in the recording medium of the computer may be downloaded via a communication network such as the Internet.

(Other Exemplary Embodiments)

According to the above-mentioned exemplary embodiments and examples, for the same user, the thin client function that the server provides automatically switches between the screen transfer type and the network boot type depending on attribute of the user terminal; in either case, the same usage environment is provided. The following is a list of other exemplary embodiments.

According to other exemplary embodiment of the present invention, a server function switching device is connected to user terminals including a network-boot-type user terminal and a screen-transfer-type user terminal via a network, and is used in a thin client system. The server function switching device includes a boot image transfer section that provides the network-boot-type terminal with a boot image containing a collection of files necessary for a boot process; a terminal process proxy execution section that provides an execution environment of the screen-transfer-type user terminal and screen information; and a server function switching section. The server function switching section receives from the user terminal a connection request containing attribute information of the user terminal; determines the attribute of the user terminal based on the attribute information; and lets the boot image transfer section transfer the boot image to the user terminal if the user terminal is the network-boot-type user terminal, while letting the boot image transfer section transmit the boot image to the terminal process proxy execution section and letting the terminal process proxy execution section transmit the screen information to the user terminal if the user terminal is the screen-transfer-type user terminal. As for the above configuration of the server function switching device, the attribute information may be an identifier representing type of the user terminal, or a port number of TCP/IP communication.

The server function switching device having the above configuration may further include a second boot image transfer section that provides the network-boot-type user terminal with a second boot image containing a collection of files necessary for providing a screen-transfer-type thin client function. The server function switching section may include means to make a determination as to whether to let the user terminal operate as a network-boot-type thin client or a screen-transfer-type thin client, based on information that is included in the connection request and represents performance of a network connection, if the user terminal is the network-boot-type user terminal; and let the boot image transfer section transfer the boot image to the user terminal if it is determined that the user terminal should work as the network-boot-type thin client, while letting the second boot image transfer section transmit the second boot image to the user terminal if it is determined that the user terminal should work as the screen-transfer-type thin client.

With the server function switching device having the above configuration, the information representing performance of a network connection may contain information representing the transfer speed of a network connection; the server function switching section may determine that that the user terminal should work as the screen-transfer-type thin client if the transfer speed is less than a predetermined reference value, while determining that the user terminal should work as the network-boot-type thin client if the transfer speed is greater than or equal to the reference value.

With the server function switching device having the above configuration, the information representing performance of a network connection may contain information representing network latency. The information representing performance of a network connection may contain information representing the reliability of a network.

With the server function switching device having the above configuration, the network may include a plurality of networks; and the server function switching section may make a determination for each of a plurality of the networks as to whether to let the user terminal operate as the network-boot-type thin client or the screen-transfer-type thin client. A hibernation image may be used instead of the boot image: The hibernation image is a file in which the state of a memory of a running machine is saved. The boot image may include a plurality of boot images; and the connection request may include an identifier specifying a plurality of the boot images.

With the server function switching device having the above configuration, the boot image transfer section, the terminal process proxy execution section, and the server function switching section may be configured so that the boot image transfer section, the terminal process proxy execution section, and the server function switching section run on one computer. The boot image transfer section, the terminal process proxy execution section, and the server function switching section may be configured so that the boot image transfer section, the terminal process proxy execution section, and the server function switching section run on a cluster including a plurality of computers. The boot image transfer section, the terminal process proxy execution section, and the server function switching section may be configured so that the boot image transfer section, the terminal process proxy execution section, and the server function switching section are disposed in a decentralized manner in a plurality of data centers on a wide area network to operate.

According to other exemplary embodiment of the present invention, a server function switching method is connected to user terminals including a network-boot-type user terminal and a screen-transfer-type user terminal via a network and is used in a thin client system. According to the method, a boot image transfer section provides the network-boot-type user terminal with a boot image containing a collection of files necessary for a boot process; a terminal process proxy execution section provides an execution environment of the screen-transfer-type user terminal, and screen information. The server function switching section receives from the user terminal a connection request containing attribute information of the user terminal and determines the attribute of the user terminal based on the attribute information; lets the boot image transfer section transfer the boot image to the user terminal if the user terminal is the network-boot-type user terminal; and lets the boot image transfer section transmit the boot image to the terminal process proxy execution section and lets the terminal process proxy execution section transmit the screen information to the user terminal if the user terminal is the screen-transfer-type user terminal.

Furthermore, according to the above server function switching method, a second boot image transfer section provides the network-boot-type user terminal with a second boot image containing a collection of files necessary for providing a screen-transfer-type thin client function. Moreover, the server function switching section makes a determination as to whether to let the user terminal operate as a network-boot-type thin client or a screen-transfer-type thin client, based on information that is included in the connection request and represents performance of a network connection, if the user terminal is the network-boot-type user terminal. Accordingly, the server function switching section lets the boot image transfer section transfer the boot image to the user terminal if it is determined that the user terminal should work as the network-boot-type thin client. The server function switching section lets the second boot image transfer section transmit the second boot image to the user terminal if it is determined that the user terminal should work as the screen-transfer-type thin client.

According to other exemplary embodiment of the present invention, a server function switching program is an operation program of a server function switching device that is connected to user terminals including a network-boot-type user terminal and a screen-transfer-type user terminal via a network and that is used in a thin client system. The operation program causes a computer to function as: a boot image transfer section that provides the network-boot-type user terminal with a boot image containing a collection of files necessary for a boot process; a terminal process proxy execution section that provides an execution environment of the screen-transfer-type user terminal, and screen information; and a server function switching section that receives from the user terminal a connection request containing attribute information of the user terminal, determines the attribute of the user terminal based on the attribute information, and lets the boot image transfer section transfer the boot image to the user terminal if the user terminal is the network-boot-type user terminal while letting the boot image transfer section transmit the boot image to the terminal process proxy execution section and letting the terminal process proxy execution section transmit the screen information to the user terminal if the user terminal is the screen-transfer-type user terminal.

According to other exemplary embodiment of the present invention, a thin client system includes one of the above-described server function switching devices. Moreover, according to other exemplary embodiment of the present invention, the server device is used in the thin client system.

The above describes, in detail, the exemplary embodiments and examples of the present invention. However, the present invention is not limited to the above exemplary embodiments and examples, which are illustrated as representative examples. Those skilled in the art can make various modifications and alterations within the scope of the present invention based on the claims stated below. The present invention includes those modified or altered.

INDUSTRIAL APPLICABILITY

The present invention can also be applied to a screen-transfer/network-boot switching system, which serves as a server function switching device used in a thin client system, method and program, and a thin client system and a server device, as well as a server for remote access. Moreover, the present invention can be applied to a data center where remote-access processes are collectively performed.

The invention claimed is:

1. A server function switching device that is connected to user terminals including a network-boot-type user terminal and a screen-transfer-type user terminal via a network and that is used in a thin client system, comprising:
   a boot image transfer circuit that provides a first boot image of a plurality of boot images, each one of which contains a collection of files necessary for a boot process;
   a terminal process proxy execution circuit that provides an execution environment for a boot image and further provides screen information;
   a second boot image transfer circuit that provides a second boot image containing a collection of files necessary for providing a screen-transfer-type thin client function;
   a server function switching circuit that:
      receives from a user terminal of the user terminals a connection request containing attribute information of the user terminal, the attribute information including information indicating whether the user terminal is a network-boot-type user terminal or a screen-transfer-type user terminal,
      determines whether the user terminal is a network-boot-type user terminal or a screen-transfer-type user terminal based on the attribute information,
      if the user terminal is determined to be a network-boot-type user terminal, determines if the network-boot-type user terminal should operate as a network-boot-type thin client or a screen-transfer-type thin client, based on information that is included in the connection request and represents performance of a network connection,
      if the network-boot-type user terminal should work as a network-boot-type thin client, the boot image transfer circuit transfers the first boot image to the network-boot-type user terminal and the network-boot-type terminal executes the first boot image,
      if the network-boot-type user terminal should work as a screen-transfer-type thin client, the second boot image transfer circuit transmits the second boot image to the network-boot-type terminal and the network-boot-type terminal executes the second boot image, and the boot image transfer circuit transfers the first boot image to the terminal process proxy execution circuit, which executes the first boot image and transmits screen information to the network-boot-type terminal, and
      if the user terminal is determined to be the screen-transfer-type user terminal, the boot image transfer circuit transmits the first boot image to the terminal process proxy execution circuit, which executes the first boot image, and transmits the screen information to the user terminal.

2. The server function switching device according to claim 1, wherein
the information representing performance of a network connection contains information representing the transfer speed of a network connection, and
the server function switching circuit determines that the user terminal should work as a screen-transfer-type thin client if the transfer speed is less than a predetermined reference value, while determining that the user terminal should work as a network-boot-type thin client if the transfer speed is greater than or equal to the reference value.

3. The server function switching device according to claim 1, wherein
the information representing performance of a network connection contains information representing network latency.

4. The server function switching device according to claim 1, wherein
the information representing performance of a network connection contains information representing the reliability of a network.

5. The server function switching device according to claim 1, wherein:
the network includes a plurality of networks, and
the server function switching circuit makes a determination for each of a plurality of the networks as to whether the user terminal should operate as a network-boot-type thin client or a screen-transfer-type thin client.

6. An operation method of a server function switching device that is connected to user terminals including a network-boot-type user terminal and a screen-transfer-type user terminal via a network and that is used in a thin client system, wherein:
a boot image transfer circuit provides a first boot image of a plurality of boot images, each one of which contains a collection of files necessary for a boot process;
a second boot image transfer circuit provides a second boot image containing a collection of files necessary for providing a screen-transfer-type thin client function;
a terminal process proxy execution circuit provides an execution environment for a boot image, and further provides screen information;
a server function switching circuit receives from a user terminal of the user terminals a connection request containing attribute information of the user terminal, the attribute information including information indicating whether the user terminal is a network-boot-type user terminal or a screen-transfer-type user terminal,
the sever function switching circuit determines whether the user terminal is a network-boot-type user terminal or a screen-transfer-type user terminal based on the attribute information;
if the user terminal is determined to be a network-boot-type user terminal, the server function switching circuit determines if the network-boot-type user terminal should operate as a network-boot-type thin client or a screen-transfer-type thin client, based on information that is included in the connection request and represents performance of a network connection;
if the network-boot-type terminal should work as a network-boot-type thin client, the boot image transfer circuit transfers the first boot image to the network-boot-type user terminal and the network-boot-type terminal executes the first boot image;
if the network-boot-type user terminal should work as a screen-transfer-type thin client, the second boot image transfer circuit transmits the second boot image to the network-boot-type terminal and the network-boot-type terminal executes the second boot image, and the boot image transfer circuit transfers the first boot image to the terminal process proxy execution circuit, which executes the first boot image and transmits screen information to the network-boot-type terminal; and
if the user terminal is determined to be the screen-transfer-type user terminal, the boot image transfer circuit transmits the first boot image to the terminal process proxy execution circuit, which executes the first boot image, and transmits the screen information to the user terminal.

* * * * *